UNITED STATES PATENT OFFICE.

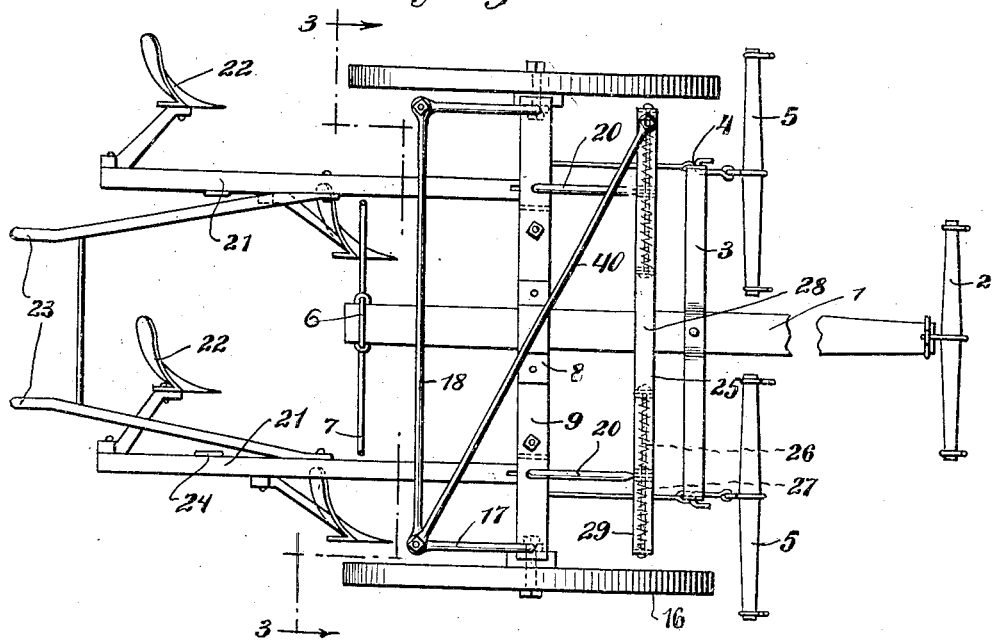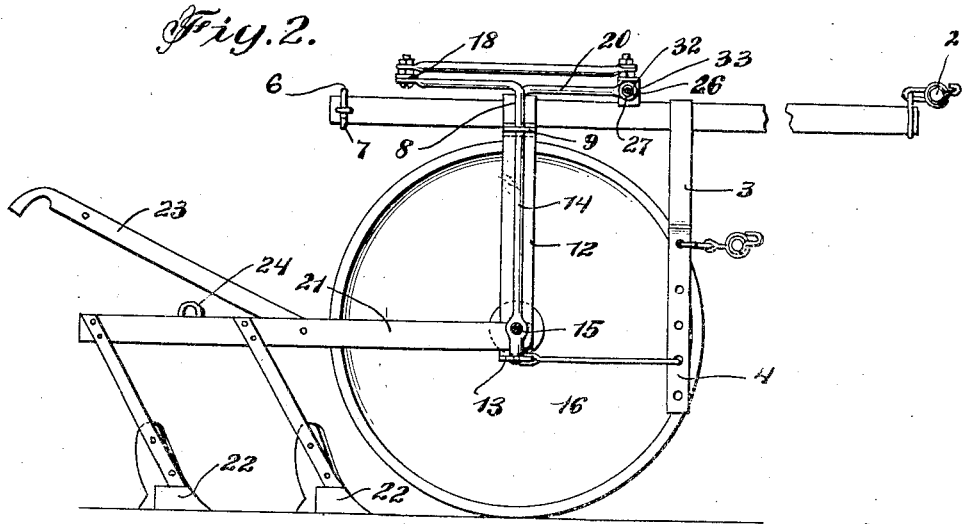

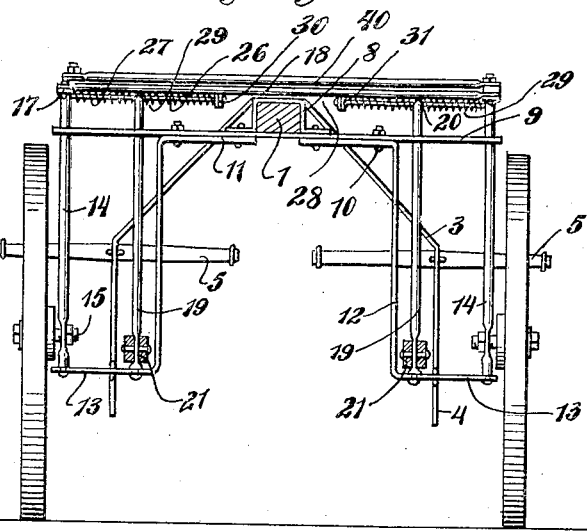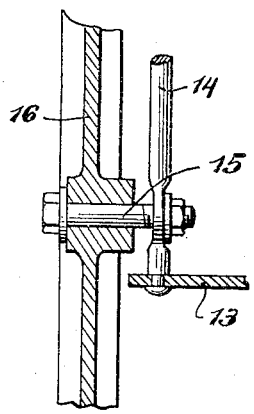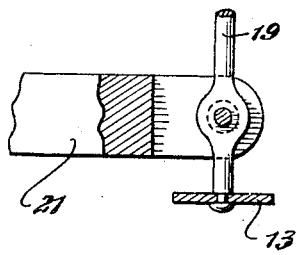

DAVID BLASER, OF TAYLOR RIDGE, ILLINOIS.

WALKING-CULTIVATOR.

1,348,693.        Specification of Letters Patent.        Patented Aug. 3, 1920.

Application filed January 12, 1920.  Serial No. 350,834.

*To all whom it may concern:*

Be it known that I, DAVID BLASER, a citizen of the United States, residing at Taylor Ridge, in the county of Rock Island and State of Illinois, have invented new and useful Improvements in Walking-Cultivators, of which the following is a specification.

The object of my present invention is the provision of a walking cultivator embodying such a construction that it may be efficiently controlled by the operator.

To the attainment of the foregoing, the invention consists in the improvement as hereinafter described and definitely claimed.

In the accompanying drawings, hereby made a part hereof:

Figure 1 is a plan view of my novel walking cultivator.

Fig. 2 is a side elevation of the same.

Fig. 3 is a transverse section taken in the plane indicated by the line 3—3 of Fig. 1, looking forwardly.

Figs. 4 and 5 are views of details hereinafter explicitly referred to.

Similar numerals of reference designate corresponding parts in all of the views of the drawings.

Among other elements my novel walking cultivator comprises a tongue 1 with a neck-yoke 2 at its forward end, and a transverse lever 3 pivoted on the tongue and having pendent portions 4 for the connection at suitable heights of swingletrees 5. On the rear portion of the tongue 1 is a bracket 6 having hook-like arms 7.

Fixed on the tongue 1 at an intermediate point in the length thereof is a yoke 8 having transverse portions 9, and opposed to and adjustably connected at 10 to the said transverse portions 9 of the yoke are transversely adjustable bars 11 each of which is provided at an intermediate point of its length, with a pendent bar portion 12 that has an outwardly directed arm 13. The said pendent bar portions 12 serve in conjunction with the yoke and the transversely adjustable bars 11 to form a straddle-row arch adjustable as to width, as necessity demands.

Journaled in the transverse bars 11 and in the arms 13 of the pendent bar portions 12 are upright rock-shafts 14 on which are spindles 15 that carry the ground wheels 16. At their upper ends the said rock-shafts 14 are provided with rearwardly directed arms 17 which are connected together through the medium of a transverse rod 18, so as to assure the wheels 16 swinging laterally in concert.

Also journaled in the transverse bars 11 and the arms 13 are inner upright rock-shafts 19 that have forwardly directed arms 20 at their upper ends. Connected to the lower portions of the inner rock-shafts 19 at slight distances above the arms 13 are beams 21, the connections being such as to enable the beams to swing vertically on the inner rock-shafts 19, and to swing laterally with the said inner rock-shafts. The said beams 21 are equipped with shovels or plows 22 and handles 23, and on each beam 21 is a loop 24 by which the beam may be suspended in raised and idle position on one of the hook-like arms 7, as when it is desired to move the cultivator along a row or from one point of a farm to another.

Arranged transversely above the forward ends of the arms 20 on the inner rock-shafts 19 is a carrier 25 for transverse rods 26 on which are coiled springs 27. For purposes of adjustment, the said transverse carrier 25 is preferably made up of an inner section 28 and outer sections 29 adjustably connected at 30 to the inner section 28, and each having pendent abutments 31 for the outer ends of the springs 27. It will be observed in this connection that the rods 26 are extended through apertures 32 in the arms 20, and that the said arms 20 are cushioned at opposite sides thereof by the springs 27, washers 33 being preferably interposed between the arms 20 and the springs, as illustrated. It will also be observed by particular reference to Fig. 1, that the beams 21 are so shaped as to avoid contact between the said beams and the ground wheels 16 when the latter are swung laterally.

Interposed between and connected to one of the rearwardly directed arms 17 and the end of the transverse carrier 25 remote from the said arm 17, is a rod 40, through the medium of which the transverse carrier 25 is moved in concert with lateral swinging movements of the ground wheel 16.

In the practical operation of my novel cultivator, it will be apparent that the operator is enabled to swing the beams 21 inwardly and outwardly against the action of the springs 27, without any lateral movement whatever of the ground wheels 16. For instance the operator may swing the beams inwardly so as to assure the cutting of weeds away from the hills of corn or other plants that are being worked. It will also be apparent that when the beams 21 are swung laterally in the same direction, the ground wheels 16 will, through the connections described, also be swung laterally. From this it follows that the plow can be kept in proper position relatively to the row that is being worked irrespective of the paths of the draft animals, and whether or no the draft animals traverse straight paths or paths parallel to the row that is being worked. It will further be understood that the transverse carrier 25 will be moved synchronously with the lateral movements of the ground wheels, so that at all times the beams 21 may be moved toward and away from each other against the action of the springs 27.

Having described my invention, what I claim and desire to secure by Letters-Patent, is:—

1. In a straddle-row walking cultivator, the combination of an arch frame, outer and inner upright rock-shafts journaled in said frame, the outer shafts having rearwardly directed arms at their upper ends, and the inner shafts having forwardly directed arms on their upper ends, spindles carried by the outer rock-shafts, ground wheels mounted on said spindles, beams connected and adapted to swing laterally with the inner rock-shafts and equipped with ground-working devices, a transverse rod connecting the rearwardly directed arms of the outer rock-shafts, a transverse spring carrier connected with the arms of the inner rock-shafts, springs disposed in said carrier and at opposite sides of the arms of the inner rock-shafts, and a rod connected to the said spring carrier adjacent to one end thereof and also connected to the arm of the outer rock-shaft remote from said end.

2. In a straddle-row walking cultivator, the combination of an arch frame, outer and inner upright rock-shafts journaled in said frame, the outer shafts having rearwardly directed arms at their upper ends, and the inner shafts having forwardly directed arms on their upper ends, spindles carried by the outer rock-shafts, ground wheels mounted on said spindles, beams connected and adapted to swing laterally with the inner rock-shafts and equipped with ground working devices, a transverse rod connecting the rearwardly directed arms of the outer rock-shafts, a transverse spring carrier connected with the arms of the inner rock-shafts, springs disposed in said carrier and at opposite sides of the arms of the inner rock-shafts, a rod connected to the said spring carrier adjacent to one end thereof and also connected to the arm of the outer rock-shaft remote from said end, a tongue fixed to and extending forwardly and rearwardly from the transverse arch frame, hook-like arms on the rear portion of said tongue, and loops on the beams and adapted when the beams are swung upwardly to be engaged with said hook-like arms.

3. The combination in a walking cultivator, of a frame, outer and inner upright rock-shafts journaled in said frame, the outer rock-shaft carrying ground wheels and having arms connected together and the inner rock-shafts also having arms, a spring carrier connected with one of the outer rock-shafts and also connected with the arms of the inner rock-shafts and equipped with springs disposed at opposite sides of the latter arms, and beams connected with and adapted to transmit turning movement to the inner rock-shafts and having handles.

In testimony whereof I affix my signature.

DAVID BLASER.